United States Patent
Machida

(12) United States Patent — Machida
(10) Patent No.: US 8,026,897 B2
(45) Date of Patent: Sep. 27, 2011

(54) CURSOR MOTION CONTROL OF A POINTING DEVICE

(75) Inventor: Akihiro Machida, Sunnyvale, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 1847 days.

(21) Appl. No.: 10/994,692

(22) Filed: Nov. 22, 2004

(65) Prior Publication Data

US 2006/0132435 A1   Jun. 22, 2006

(51) Int. Cl.
*G09G 3/33* (2006.01)

(52) U.S. Cl. ........ 345/159; 345/156; 345/157; 345/158; 715/856

(58) Field of Classification Search .......... 345/156–159; 715/856–862
See application file for complete search history.

(56) References Cited

U.S. PATENT DOCUMENTS

| | | | |
|---|---|---|---|
| 6,057,540 A * | 5/2000 | Gordon et al. ........ 250/221 |
| 6,232,959 B1 * | 5/2001 | Pedersen ........ 345/161 |
| 6,281,882 B1 | 8/2001 | Gordon et al. |
| 6,310,605 B1 * | 10/2001 | Rosenberg et al. ........ 345/157 |
| 6,414,671 B1 * | 7/2002 | Gillespie et al. ........ 345/157 |
| 7,164,411 B2 * | 1/2007 | Keranen et al. ........ 345/156 |
| 7,312,785 B2 * | 12/2007 | Tsuk et al. ........ 345/156 |
| 2002/0054019 A1 * | 5/2002 | Rosenberg et al. ........ 345/157 |
| 2003/0117370 A1 * | 6/2003 | Van Brocklin et al. ........ 345/156 |
| 2007/0002010 A1 * | 1/2007 | De Samber et al. ........ 345/156 |

* cited by examiner

*Primary Examiner* — Alexander Eisen
*Assistant Examiner* — Christopher E Leiby

(57) ABSTRACT

A pointing device generates pixel counts at a predetermined frame rate indicative of motion in predetermined axes of a user's digit across an imaging surface. A cursor motion controller receives the pixel counts and generates navigation output signals representing averages over predetermined time intervals selected to smooth the motion of a cursor on the display of an electronic apparatus. Optionally, the cursor motion controller can multiply a pixel count in each frame by a predetermined acceleration factor so that a cursor on the display of an electronic apparatus will move a greater distance based on an increased rate of motion of the user's digit across the imaging surface. Optionally, the cursor motion controller can interrupt the generation of navigation output signals for a predetermined interrupt period after completion of a cursor stroke. The averaging, acceleration and interruption features can be used independently or in various combinations.

22 Claims, 4 Drawing Sheets

- Start
- M1=0, M2=0, M3=0, M4=0, M5=0, M6=0, M7=0, M8=0, MT=0, MX=0
- N1=0, N2=0, N3=0, N4=0, N5=0, N6=0, N7=0, N8=0, NT=0, NY=0
- Read Dx, Read Dy
  - M1=Dx, M2=M1, M3=M2, M4=M3, M5=M4, M6=M5, M7=M6, M8=M7
  - MT=M1+M2+M3+M4+M5+M6+M7+M8
  - MX=INT(MT/8)
  - N1=Dy, N2=N1, N3=N2, N4=N3, N5=N4, N6=N5, N7=N6, N8=N7
  - NT=N1+N2+N3+N4+N5+N6+N7+N8
  - NY=INT(NT/8)
  - Report MX, Report NY
- Return to read Dx, Dy

FIG. 4

CURSOR MOTION CONTROL OF A POINTING DEVICE

BACKGROUND OF THE INVENTION

The use of hand operated pointing devices to control the position of a cursor on a computer display has become extremely widespread. The most popular of such navigation devices is the mouse. Recently, in computer mouses being commercialized in the United States, the mechanical ball that partially protrudes through the underside of the mouse has been replaced with an optical laser tracking device to avoid failures due to lint build-up and mechanical wear associated with the ball. See U.S. Pat. No. 6,281,882 granted Aug. 28, 2001 to Gordon et al., assigned to Agilent Technologies, Inc., and entitled PROXIMITY DETECTOR FOR A SEEING EYE MOUSE.

Small track balls, drag pads, and strain sensing sticks have been used on lap top computers since they are often used in environments where a drag surface for a mouse is not available and it is impractical to have a cord connecting the lap top to the pointing device. In so-called personal digital assistants (PDAs) a stylus is often used to select icons and write cryptic symbols onto a tiny touch screen that are interpreted by character recognition software.

As PDAs, cell phones, pagers, pocket PCs, music players, digital cameras, game controllers, presentation pointers and other portable hand held electronic apparatus gain popularity, there is a need for an improved pointing device that is compact, accurate, durable and easy to operate. The use of a pointing device on a portable hand held electronic apparatus enables multidirectional cursor control for menu selection, web browsing and other user controlled functions. One example of a suitable pointing device for this application is disclosed in U.S. Pat. No. 6,057,540 granted May 2, 2000 to Gordon et al., assigned to Hewlett-Packard Company, and entitled MOUSELESS OPTICAL AND POSITION TRANSLATION TYPE SCREEN POINTER CONTROL FOR A COMPUTER SYSTEM. A user's finger tip is moved over the distal end of a transparent rod lens which provides an imaging surface. Light from an LED adjacent the proximal end of the rod lens illuminates the finger tip. A plurality of photo detectors in a movement sensor adjacent the proximal end of the rod receive light reflected from the finger tip which is focused on the detectors by another lens also on the proximal end of the rod lens. The movement sensor generates pixelized representations comprising a reference array and shifted versions thereof that are used to generate navigation signals indicative of motion in X and Y axes.

It has been discovered that a pointing device that relies on the motion of a digit across an imaging surface can produce annoying inaccuracies due to jagged and/or non-uniform cursor movement. This appears to be due to the fact that the surface of a finger tip or other digit is not rigid like a desktop or mouse pad. The surface of the finger tip lags and whips as it is dragged across the rigid, stationary imaging surface formed by the distal end of the rod lens.

Another shortcoming of a pointing device that relies on the motion of a digit across an imaging surface is that multiple finger strokes may be necessary to move the cursor from one side of the display to the other. This drawback is similar to that encountered with drag pads incorporated into lap top computers.

Still another shortcoming of a pointing device that relies on the motion of a digit across an imaging surface is that it is sometimes difficult to make the transition between cursor movement and action selection, for example at a menu or URL link. A finger lift-up motion followed by a finger put-down motion to accomplish a click can lead to spurious cursor motion and ineffective user commands.

SUMMARY OF THE INVENTION

A system is provided for controlling the motion of a cursor on a display of an electronic apparatus. A pointing device generates pixel counts at a predetermined frame rate indicative of motion in predetermined axes of a user's digit across an imaging surface. A cursor motion controller receives the pixel counts and generates navigation output signals representing averages over predetermined time intervals selected to smooth the motion of a cursor on the display of the hand held electronic apparatus. Optionally the cursor motion controller can multiply a pixel count in each frame by a predetermined acceleration factor so that a cursor on the display of an electronic apparatus will move a greater distance based on an increased rate of motion of the user's digit across the imaging surface. According to another option, the cursor motion controller can interrupt the generation of navigation output signals for a predetermined interrupt period after completion of a cursor stroke. The averaging, acceleration and interruption features can be used independently or in various combinations.

A method is also provided for controlling the motion of a cursor on a display. The method includes the step of generating pixel counts at a predetermined frame rate indicative of motion in predetermined axes of a user's digit across an imaging surface. The method includes the further step of generating navigation output signals based on the pixel counts that represent averages over predetermined time intervals selected to smooth the motion of a cursor on a display of an electronic apparatus.

BRIEF DESCRIPTION OF THE DRAWINGS

FIG. 4 illustrates an algorithm that will accomplish the averaging technique that smooths the motion of the cursor driven by the pointing devices of FIGS. 1, 2A and 2B.

DETAILED DESCRIPTION

Figure 1:
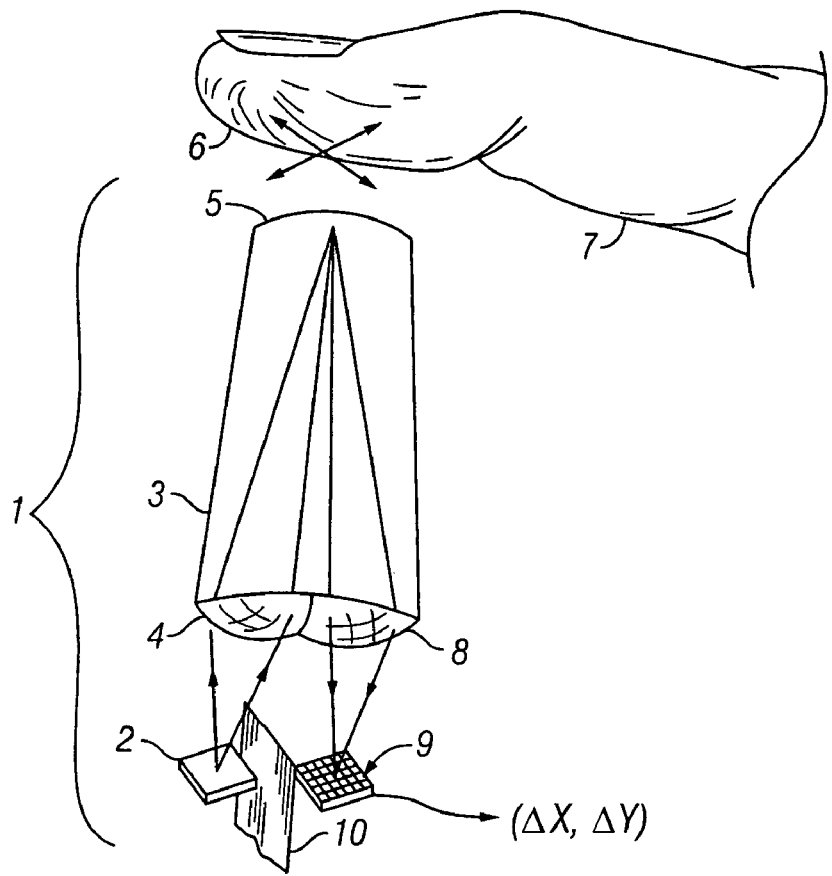
FIG. 1 is a simplified pictographic side view of the main components, in isolation, of a pointing device that may be used with an embodiment of the present invention.

FIG. 1 illustrates a prior art pointing device 1 that relies on the motion of a digit across an imaging surface to move a cursor on a display, details of which may be found in the aforementioned U.S. Pat. No. 6,057,540 of Gordon et al. The tip 6 of a finger 7 is pressed against the distal end or imaging surface 5 of a transparent plastic stud that forms a rod lens 3. An infrared LED light source 2 emits light that is gathered and focused by a lens 4 on the proximal end of the rod lens 3. Ridges and other surface features on the finger tip 6 are illuminated by the light conveyed through the rod lens 3. An array of photo detectors in a movement sensor 9 adjacent the proximal end of the rod lens 3 receives light reflected from the finger tip 6 which is focused on the detectors by another lens 8 also on the proximal end of the rod lens 3. The movement sensor 9 generates pixelized representations comprising a reference array and shifted versions thereof that are used to produce delta X and delta Y signals indicative of motion in X and Y axes. An opaque barrier 10 keeps stray light from the LED 2 from reaching the movement sensor 9.

Figure 2A:
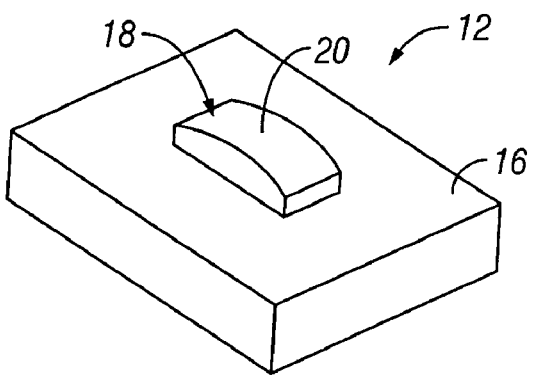
FIGS. 2A and 2B illustrate alternate forms of a pointing device that relies on the motion of a digit across an imaging surface to generate cursor navigation signals.
Figure 2B:
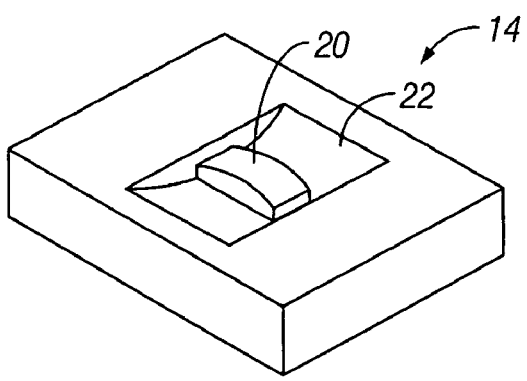

FIGS. 2A and 2B illustrate alternate forms, 12 and 14 respectively, of a pointing device similar in design to that of FIG. 1 in that it also relies on the motion of a digit across an imaging surface to generate navigation signals that can be used by a hand held electronic apparatus to move a cursor on its display. The device 12 (FIG. 2A) has a housing 16 which is rectangular but could be ergonomically configured. A finger interface 18 protrudes from the top surface of the housing 16 and has a top convex imaging surface 20 across which the finger tip 6 can be moved. The device 14 (FIG. 2B) is similar to the device 12 except that the finger interface 18 is mounted in a groove 22 to direct the finger tip 6 across the convex imaging surface 20 in one non-rotating motion.

Figure 3:
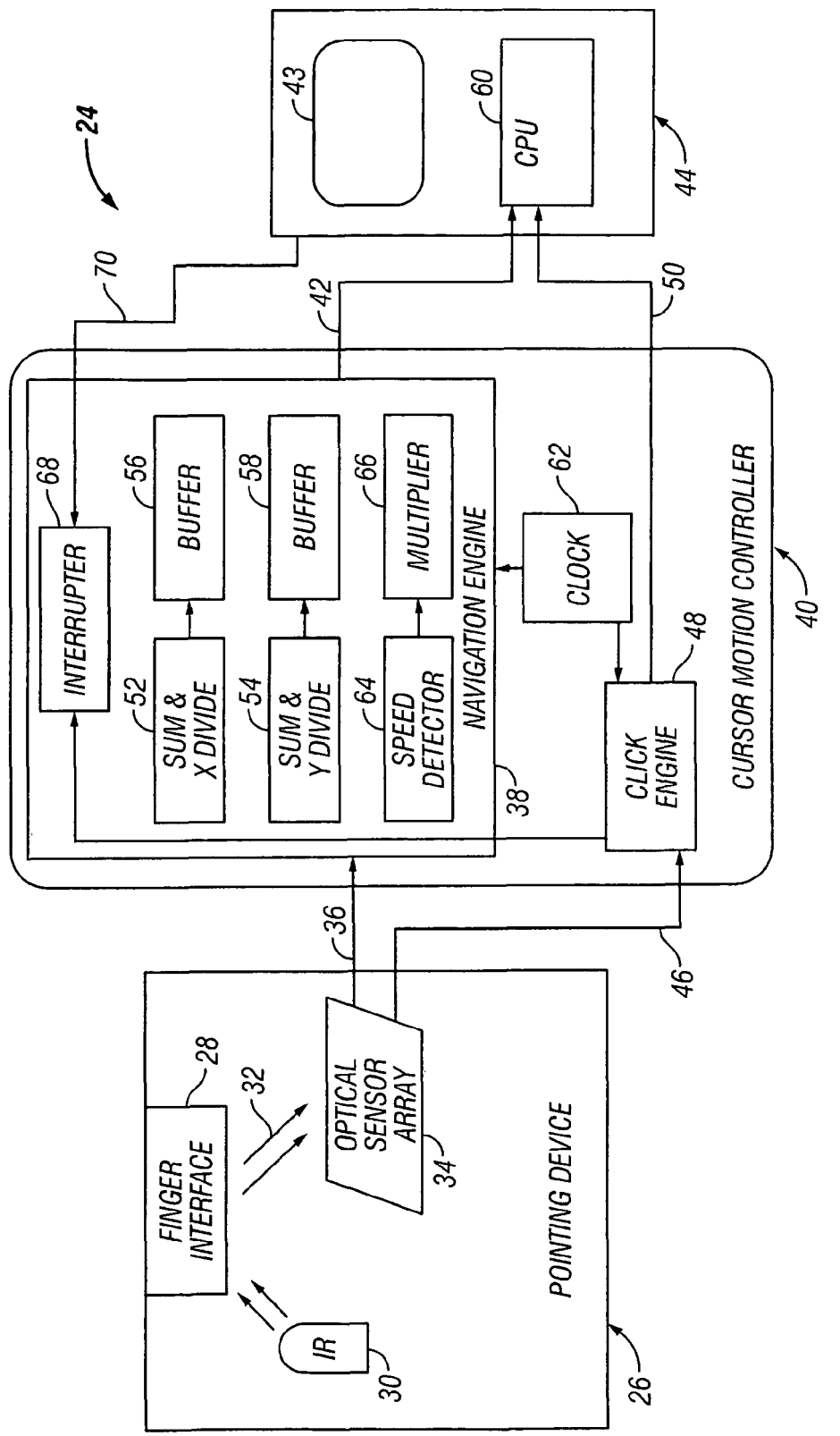
FIG. 3 is a block diagram of an embodiment of a system of the present invention.

Referring to FIG. 3, an imaging system 24 in accordance with an embodiment of my invention includes a pointing device 26 of the general type described in connection with FIGS. 1, 2A and 2B that generates pixel signals at a predetermined frame rate indicative of motion in X and Y axes of a user's digit across an imaging surface or finger interface 28. The pointing device 26 includes a light source 30, image transfer optics 32 and an optical sensor array 34. By way of example, the array 34 could include charge coupled devices (CCDs) or it could be a complementary metal oxide semiconductor active pixel sensor (CMOS-APS). An image data signal 36 in the form of raw pixel values is sent from the sensor array 34 to a navigation engine 38 in a cursor motion controller 40 for generating delta X and delta Y navigation output signals 42 that are used to control movement of a cursor on a liquid crystal display (LCD) or other display 43 of a hand held electronic apparatus 44.

An image data signal 46 is also sent from the sensor array 34 to a click engine 48 in the cursor motion controller 40. The click engine 48 detects finger lift-up and finger put-down motions, which are used to generate click output signals 50 that are also sent to the hand held electronic apparatus 44. The image data signal 46 can be a tracking quality signal indicative of the reliability of the image data signal 36 or it can be a shutter speed or frame rate signal that indicates the data capture rate in identifying features on the finger tip 6 as it moves across the finger interface 28. Alternatively, the image data signal 46 can be a unidirectional signal identifying the correspondence between the detected image and a surface pattern indicator.

The click engine 48 detects finger lift-up and finger put-down motions by comparing the value of a current tracking quality signal with the value of the previous tracking quality signal. Tracking quality is considered poor or low when the finger tip 6 is not in focus due to the finger not touching the finger interface 28. The click engine 48 will normally only determine a click if a finger lift-up motion is followed by a finger put-down motion within a predetermined time interval. The click engine 48 can determine a simple finger lift-up motion that is not a click, but merely the end of a stroke. The click engine 48 preferably ignores the last few delta X and delta Y inputs.

The cursor motion controller 40 receives raw pixel values at a predetermined frame rate of, for example, between about five hundred and twelve hundred frames per second. The delta X and delta Y pixel counts for a predetermined number of frames, e.g. zero to three pixel counts per frame for both the X axis and the Y axis, are averaged by summation/dividers 52 and 54, and sent to buffers 56 and 58 before being transmitted to the CPU 60 of the hand held electronic apparatus 44. Transmission of data from the buffers 56 and 58 is uniformly periodic as a result of clocking data inputted from clock 62.

A speed detector 64 determines a speed of motion of the finger tip 6 across the finger interface 28 within a predetermined period of time by monitoring the motion distance per frame. A multiplier 66 multiplies the pixel count (regardless of pixel value) by a predetermined acceleration factor preferably obtained from a look-up table. For example, if the average pixel count is less than one, the acceleration factor can be one. If the average pixel count per frame is greater than or equal to one but less than two, the acceleration factor can be two. If the average pixel count per frame is greater than or equal to two but less than three, the acceleration factor can be four. If the average pixel count per frame is greater than or equal to three but less than four, the acceleration factor can be eight. As the average pixel rate per frame increases in linear fashion, the acceleration factor preferably increases at a greater rate, e.g. exponentially.

An interrupter 68 senses a break or pause in the movement of the motion of finger tip 6 across the finger interface 28. The interrupter 68 causes any pixel values received after a cursor stroke is completed to be temporarily discarded or ignored for a predetermined time period. The interrupter 68 can utilize an algorithm to determine the end of a stroke of the cursor which depends primarily upon detection of speed and uniformity of movement. A simpler, more reliable method of actuating the interrupter 68 is to provide a signal 70 from the hand held electronic apparatus 44 which indicates that the cursor is juxtaposed over an icon, hyperlink, marking region, or other selection item on the display, and to disable the cursor motion controller 40 from sending the navigation output signals 42 to the hand held electronic apparatus 44 for a is predetermined time, e.g. 0.5 seconds. Alternately, finger lift-up and finger put-down motions that are used for clicking can be detected by the click engine 48 and used to momentarily disable motion of the cursor on the display of the hand held electronic apparatus 44 to prevent spurious motion of the cursor which is particularly advantageous in mobile devices that require cursor navigation.

Figure 5:
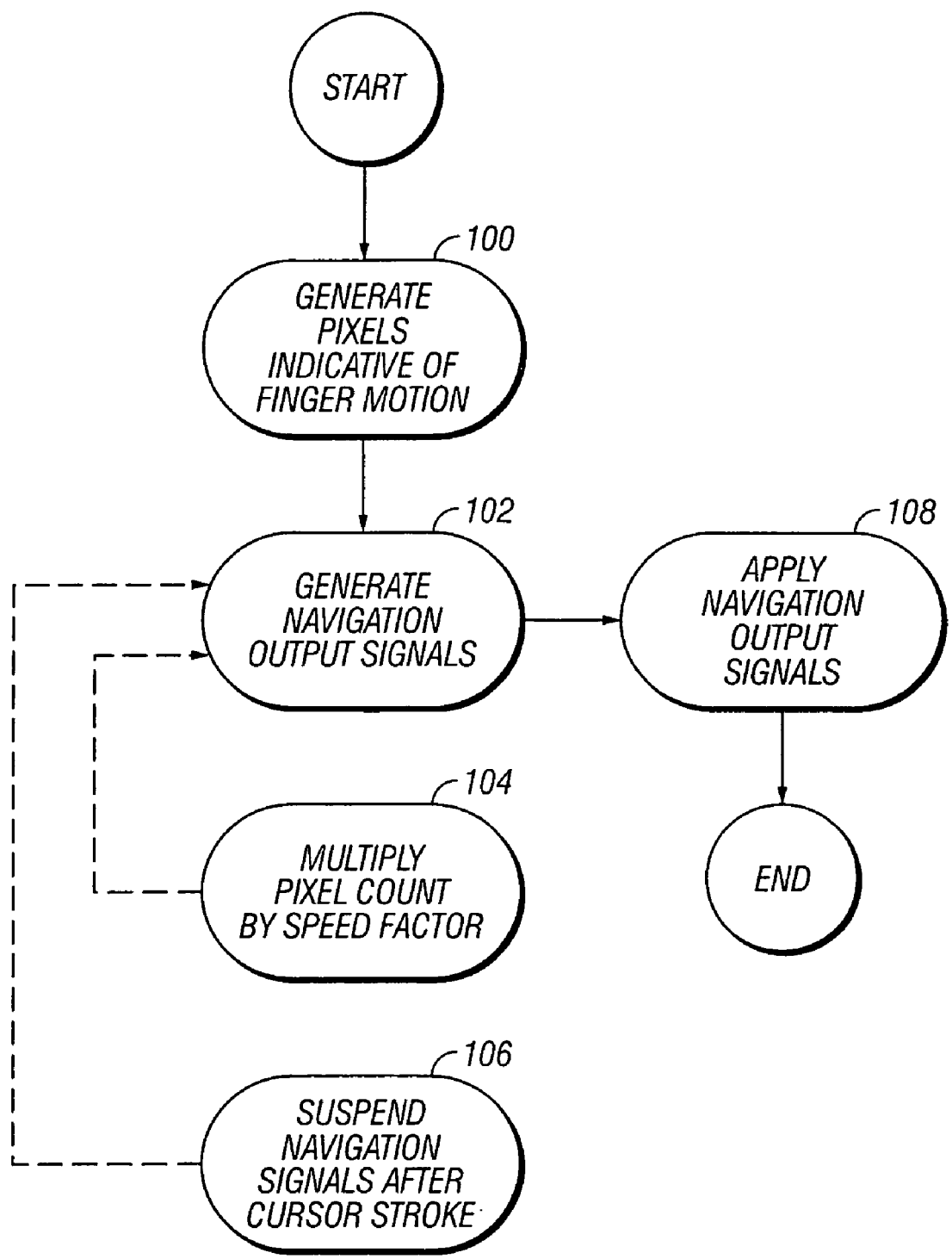
FIG. 5 is a flow diagram illustrating an embodiment of a method of the present invention.

FIG. 4 illustrates an algorithm that will accomplish the averaging described above. This results in a smoother, more accurate movement of the cursor on the hand held electronic apparatus. The algorithm is written in pseudo-code. A weighted average can also be used as in the following example:

a. Start
b. M(−1)=M(−2)=M(−3) . . . M(−7)=0
c. Initialize Alpha(i), i=0 . . . −7.
d. Read delta X
e. M(0)=delta X
f. Mx={sum[from i=1 to −7] Alpha(i)*M(i)}/{sum[from i=1 to −7] Alpha(i)}
g. for ii=−7 to −1, M(ii)=M(ii+1), end_for
h. return to read delta X FIG. 5 illustrates a method for controlling the motion of a cursor on the display of an electronic apparatus having a pointing device that relies on the motion of a digit across an imaging surface. The method includes the step 100 of generating pixel signals at a predetermined frame rate indicative of motion in predetermined axes of a user's digit across an imaging surface. The method includes the further step 102 of generating navigation output signals based on the pixel signals that represent averages over predetermined time intervals selected to smooth the motion of a cursor on a display of an electronic apparatus. The method may further comprise the optional step 104 of multiplying a pixel count in each frame by a predetermined acceleration factor so that the cursor on the display will move a greater distance based on an increased rate of motion of the user's digit across the imaging surface. The method may further comprise the optional step 106 of temporarily suspending generation of navigation output signals for a predetermined interrupt period after completion of a cursor stroke. This may be accomplished based upon receipt of an interrupt signal from the hand held electronic apparatus that is generated when the cursor is juxtaposed over a selection item on the display 43. The navigation output signals are applied to the CPU 60 of the hand held electronic apparatus 44 in step 108.

When the cursor motion is smoothed with the averaging technique disclosed herein there may be some price in terms of delay and sensitivity. However this is not a problem in many hand held electronic apparatus but only in connection with desk top PCs having high resolution displays, and even then perhaps only in certain applications such as gaming.

While both method and apparatus embodiments of the present invention have been described, it will be appreciated by those skilled in the art that my invention can be varied and modified in both arrangement and detail. For example, the motion controller could form part of the pointing device, or could be a separate discrete device, or it could be part of the circuitry of a hand held electronic apparatus incorporating the pointing device. The motion controller could be implemented in hardware, firmware, or a combination of the two. Moreover, my motion controller could be used with other types of electronic devices with computer driven displays, besides the hand held electronic apparatus 44, such as desk top PCs. The averaging, acceleration and interruption features can be used independently or in various combinations. These features could also be applied to pointing devices not relying upon the motion of a user's digit across an imaging surface, such as a conventional mouse with a mechanical ball and a track ball. The averages represented by the navigation output signals could be simple averages, weighted averages or robust averages where outliers are discarded. Therefore, the protection afforded my invention should only be limited in accordance with the following claims.

I claim:

1. A system for controlling the motion of a cursor on a display, comprising:
   a pointing device that images a user's digit and generates pixel counts at a predetermined frame rate indicative of motion in predetermined axes of the user's digit across an imaging surface; and
   a cursor motion controller that receives the pixel counts and generates navigation output signals representing averages over predetermined time intervals selected to smooth the motion of a cursor on a display of an electronic apparatus, wherein the cursor motion controller is further configured to:
   multiply a first average pixel count of a first frame by a first acceleration factor, wherein the first acceleration factor is equal to or greater than one
   multiply a second average pixel count of a second frame by a second acceleration factor, wherein the second average pixel count is greater than the first average pixel count, wherein the second acceleration factor is greater than the first acceleration factor; and
   multiply a third average pixel count of a third frame by a third acceleration factor, wherein the third average pixel count is greater than the second average pixel count, wherein the third acceleration factor is greater than the second acceleration factor,
   wherein the multiplying by each acceleration factor that is greater than one causes the cursor on the display to move a greater distance than the average pixel count based on an increased rate of motion of the user's digit across the imaging surface.

2. The system of claim 1 wherein the pointing device generates pixel counts indicative of motion in X and Y axes.

3. The system of claim 1 wherein the cursor motion controller suspends generation of navigation output signals for a predetermined interrupt period after completion of a cursor stroke.

4. The system of claim 1 wherein the cursor motion controller suspends the generation of navigation output signals upon receipt of an interrupt signal from the hand held electronic apparatus that is generated when the cursor is juxtaposed over a selection item on the display.

5. The system of claim 4 wherein the selection item is selected from the group consisting of an icon, a hyperlink and a marking region.

6. The system of claim 1 wherein the pointing device includes a rod lens.

7. The system of claim 1 wherein the pointing device includes an LED.

8. The system of claim 1 wherein the pointing device includes an array of photo detectors.

9. The system of claim 1 wherein the cursor controller is implemented by an algorithm programmed into a memory device.

10. The system of claim 1 wherein the cursor motion controller is further configured to access each acceleration factor from a look-up table which stores a plurality of acceleration factors and associated motion distances per frame.

11. A method for controlling the motion of a cursor on a display, comprising:
    imaging a user's digit;
    generating pixel counts at a predetermined frame rate indicative of motion in predetermined axes of the user's digit across an imaging surface; and
    generating navigation output signals based on the pixel counts that represent averages over predetermined time intervals selected to smooth the motion of a cursor on a display of an electronic apparatus, wherein:
    a first average pixel count of a first frame is multiplied by a first acceleration factor, wherein the first acceleration factor is equal to or greater than one;
    a second average pixel count of a second frame is multiplied by a second acceleration factor, wherein the second average pixel count is greater than the first average pixel count, wherein the second acceleration factor is greater than the first acceleration factor;
    a third average pixel count of a third frame is multiplied by a third acceleration factor, wherein the third average pixel count is greater than the second average pixel count, wherein the third acceleration factor is greater than the second acceleration factor; and
    the multiplying by each acceleration factor that is greater than one causes the cursor on the display to move a greater distance than the average pixel count based on an increased rate of motion of the user's digit across the imaging surface.

12. The method of claim 11 wherein the pixel counts indicate motion in X and Y axes.

13. The method of claim 11 and further comprising temporarily suspending generation of navigation output signals for a predetermined interrupt period after completion of a cursor stroke.

14. The method of claim 11 and further comprising temporarily suspending the generation of navigation output signals upon receipt of an interrupt signal from the hand held electronic apparatus that is generated when the cursor is juxtaposed over a selection item on the display.

15. The method of claim 14 wherein the selection item is selected from the group consisting of an icon, a hyperlink and a marking region.

16. The method of claim 14 wherein the generation of navigation output signals is temporarily suspended for one-half of a second.

17. The method of claim 11 wherein the pixel counts are generated by a pointing device that includes a rod lens.

18. The method of claim 11 wherein the navigation output signals are generated using an algorithm programmed into a memory device.

19. The method of claim 11 further comprising accessing each acceleration factor from a look-up table which stores a plurality of acceleration factors and associated motion distances per frame.

20. A system for controlling the motion of a cursor on a display, comprising:
   a pointing device that images a user's digit and generates pixel counts at a predetermined frame rate indicative of motion in X and Y axes of the user's digit across an imaging surface; and
   a cursor motion controller configured to:
   receive the pixel counts and generates navigation output signals representing averages over predetermined time intervals selected to smooth the motion of a cursor on a display of a hand held electronic apparatus;
   multiply a first average pixel count of a first frame by a first acceleration factor, wherein the first acceleration factor is equal to or greater than one;
   multiply a second average pixel count of a second frame by a second acceleration factor, wherein the second average pixel count is greater than the first average pixel count, wherein the second acceleration factor is greater than the first acceleration factor;
   multiply a third average pixel count of a third frame by a third acceleration factor, wherein the third average pixel count is greater than the second average pixel count, wherein the third acceleration factor is greater than the second acceleration factor,
   wherein the multiplying by each acceleration factor that is greater than one causes the cursor on the display to move a greater distance based on an increased rate of motion of the user's digit across the imaging surface; and
   suspend the generation of navigation output signals upon receipt of an interrupt signal from the hand held electronic apparatus that is generated when the cursor is juxtaposed over a selection item on the display.

21. A system for controlling the motion of a cursor on a display, comprising:
   a pointing device that images a user's digit and generates pixel counts at a predetermined frame rate indicative of motion in predetermined axes of the user's digit across an imaging surface; and
   a cursor motion controller configured to:
   multiply a first average pixel count of a first frame by a first acceleration factor, wherein the first acceleration factor is equal to or greater than one;
   multiply a second average pixel count of a second frame by a second acceleration factor, wherein the second average pixel count is greater than the first average pixel count, wherein the second acceleration factor is greater than the first acceleration factor; and
   multiply a third average pixel count of a third frame by a third acceleration factor, wherein the third average pixel count is greater than the second average pixel count, wherein the third acceleration factor is greater than the second acceleration factor,
   wherein the multiplying by each acceleration factor that is greater than one causes the cursor on the display of an electronic apparatus to move a greater distance based on an increased rate of motion of the user's digit across the imaging surface.

22. A system for controlling the motion of a cursor on a display of an electronic apparatus, the system comprising:
   a pointing device to image a user's digit and to generate pixel counts at a predetermined frame rate, wherein each pixel count is indicative of motion in predetermined axes of the user's digit across an imaging surface; and
   a cursor motion controller to:
   receive the pixel counts generated by the point device, to access an acceleration factor from a look-up table which stores a plurality of acceleration factors and associated motion distances per frame;
   multiply a first pixel count of a first frame by a first accessed acceleration factor, wherein the first accessed acceleration factor is equal to or greater than one;
   multiply a second pixel count of a second frame by a second accessed acceleration factor, wherein the second pixel count is greater than the first pixel count, wherein the second accessed acceleration factor is greater than the first accessed acceleration factor; and
   multiply a third pixel count of a third frame by a third accessed acceleration factor, wherein the third pixel count is greater than the second pixel count, wherein the third accessed acceleration factor is greater than the second accessed acceleration factor,
   wherein the multiplying by each acceleration factor that is greater than one causes the cursor on the display to move a distance corresponding to the pixel count multiplied by the accessed acceleration factor.

* * * * *